Aug. 19, 1969

G. ATTALI

WELL LOGGING METHODS AND APPARATUS HAVING PLURAL ELECTRODE ARRAYS

Filed Sept. 1, 1966

Fig. 1

Georges Attali
INVENTOR.

BY Edward M. Roney
ATTORNEY

Georges Attali
INVENTOR.

BY Edward M. Ronly

ATTORNEY

Fig. 6

United States Patent Office 3,462,679
Patented Aug. 19, 1969

3,462,679
WELL LOGGING METHODS AND APPARATUS HAVING PLURAL ELECTRODE ARRAYS
Georges Attali, Ridgefield, Conn., assignor to Schlumberger Technology Corporation, Houston, Tex., a corporation of Texas
Filed Sept. 1, 1966, Ser. No. 576,621
Int. Cl. G01v 3/02
U.S. Cl. 324—10          28 Claims

ABSTRACT OF THE DISCLOSURE

In accordance with illustrative embodiments of the present invention, a current supply means supplies current to a pair of focused electrode arrays, each having focusing electrodes on either side of a central survey electrode, for emission into formations surrounding the electrode arrays. The potential difference between the potential on a potential reference electrode located intermediate of the two electrode arrays and a reference potential supplied by the current supply means is measured and combined with measurements of the survey current emitted by each electrode array to produce separate conductivity measurements for each electrode array. The measured potential difference can also be monitored and used to determine the relative accuracy of the two conductivity measurements. If the measured potential difference indicates that both measurements have a likelihood of being erroneous, certain parameters derived from both electrode arrays can be combined in accordance with a given relationship to produce a computed conductivity measurement. Then, if the measured potential difference indicates a likelihood that all of the above designated measurements may be erroneous, that measurement which will be less in error than the others can be identified.

---

This invention relates to electrical apparatus for investigating subsurface earth formations traversed by a borehole and, more particularly, to such apparatus of a type utilizing current-emitting electrodes which are lowered into the borehole for obtaining indications of the resistivity or conductivity characteristics thereof.

One manner in which subsurface earth formations are investigated is by obtaining electrical resistivity or conductivity logs by so-called "focused" measurements. Such "focused" measurements are obtained by automatically controlling the potential and current distribution in the vicinity of an electrical logging array passed through such borehole so as to obtain desired current flow patterns. In a focused system, a survey current is emitted by a principal survey current-emitting electrode disposed in the borehole and this survey current is confined to a path substantially perpendicular to the borehole axis by focusing currents emitted from nearby electrodes on opposite sides of the principal survey electrode.

When investigating subsurface earth formations by obtaining electrical resistivity or conductivity measurements, either the voltage is maintained constant and the current variations measured or the current maintained constant and the voltage variations measured, or some combination of the two. Whichever method is utilized, it is frequently desirable to have a known reference voltage in the downhole electrical circuitry, usually approximating zero volts, so that the resistivity or conductivity value may be more accurately determined. To obtain this known reference voltage, a potential reference electrode is connected to the downhole electrical circuitry. In most prior art systems, this potential reference electrode has been placed a substantial distance from the current-emitting and return electrodes of the investigating system.

The reason for this was that the potential gradients set up by the current-emitting or return electrodes would unduly influence the potential reference electrode.

However, problems arise when the potential reference electrode is placed a great distance from the current-emitting and return electrodes. If the potential reference electrode is placed a great distance below the current-emitting and return electrodes, it would be difficult to investigate the earth formations surrounding the bottom portion of the borehole since the investigating depth point would be a substantial distance above the bottom of the borehole when the potential reference electrode touches the bottom of the borehole. On the other hand, if the potential reference electrode is placed a substantial distance above the current-emitting and return electrodes, serious problems arise because of induced voltages in the conductor connecting the potential reference electrode with the electrical circuitry contained within the downhole investigating equipment due to mutual inductance between cable conductors along the great length of cable running from the downhole investigating equipment to the surface of the earth.

By placing the potential reference electrode a reasonable distance above the downhole investigating equipment that contains the downhole electrical circuitry, and a reasonable distance from the current-emitting and return electrodes, this problem has been solved for most operating conditions. However, under certain operating conditions, as for example when there are earth strata having a very high resistivity, ordinary means of investigating subsurface earth formations fail to provide accurate resistivity or conductivity measurements. For example, when a survey and focusing current-emitting electrodes are adjacent a conductive earth strata and a current return electrode is adjacent a highly resistive earth strata, the survey and focusing current will set up a high negative potential on the current return electrode. This is caused by the survey and focusing current returning to the current return electrode through the highly resistive earth strata from infinity. This high negative potential on the current return electrode may have adverse effects on the potential reference electrode, thus introducing errors into the resistivity or conductivity measurements.

It is an object of the invention, therefore, to provide new and improved methods and apparatus for measuring the electrical resistance properties of earth formations adjacent to a borehole.

It is another object of the invention to provide new and improved borehole investigating methods and apparatus for providing more accurate measurements of the electrical resistance properties of earth formations adjacent to a borehole.

It is a further object of the invention to provide new and improved borehole investigating methods and apparatus wherein a potential reference electrode may be positioned relatively near the current-emitting and return electrodes of the investigating system and, at the same time, accurate resistivity or conductivity measurements may be obtained.

It is a further object of the invention to provide new and improved borehole investigating methods and apparatus for investigating earth formations surrounding a plurality of investigating means and providing accurate indications of at least one characteristic of the earth formations.

It is still a further object of the invention to provide new and improved borehole investigating methods and apparatus of the "focused" type in which a potential reference electrode may be positioned relatively near the current-emitting and return electrodes of the investigating system and at the same time, accurate resistivity or conductivity measurements of adjacent earth strata may be obtained under extreme borehole conditions, including measurements of the earth strata surrounding the bottom portion of the borehole.

In accordance with one feature of the invention, apparatus for investigating earth formations surrounding a borehole comprises a plurality of electrodes adapted for movement through the borehole, the electrodes including a first electrode array, at least one electrode of which is adapted to emit current into the surrounding earth formations. The plurality of electrodes further include a second electrode array, at least one electrode of which is adapted to emit current into the surrounding earth formations and a potential reference electrode located intermediate of the two electrode arrays. The apparatus further comprises first means for supplying current to at least one electrode of each of the electrode arrays, the current passing through the earth formations between the electrode arrays, and means coupled to the potential reference electrode and the first means and responsive to at least part of the current emitted by each electrode array and the potential on the potential reference electrode for providing indications of the conductivity of the surrounding earth formations. By this arrangement, current measurements derived from both electrode arrays can be used to provide separate conductivity measurements.

In accordance with another feature of the invention, the potential on the potential reference electrode can be compared with a reference potential supplied by the current supply means to produce an output signal which can be used to designate which one of the conductivity measurements derived from the two electrode arrays is more accurate. Moreover, this output signal can be used to indicate the relative homogeneity of the formation surrounding the two electrode arrays.

In accordance with another feature of the invention, a method of investigating earth formations surrounding a borehole comprises moving a plurality of electrodes, including first and second electrode arrays and a potential reference electrode, through the borehole and supplying current to the electrode arrays from a current supplying means for emission into the surrounding earth formations, the current passing through the earth formations between the electrode arrays. The method further comprises providing indications of the conductivity of the earth formations surrounding each of the electrode arrays in response to at least a portion of the current emitted into the surrounding earth formations and the difference in potential between the potential of the potential reference electrode and a potential of the current supplying means.

In accordance with still another feature of the invention, this potential difference can be monitored to provide information concerning the relative accuracy of the conductivity measurements derived from the two electrode arrays, as well as information concerning formation homogeneity.

For a better understanding of the present invention, together with other and further objects thereof, reference is had to the following description taken in connection with the accompanying drawings, the scope of the invention being pointed out in the appended claims.

Referring to the drawings.

Figure 1:
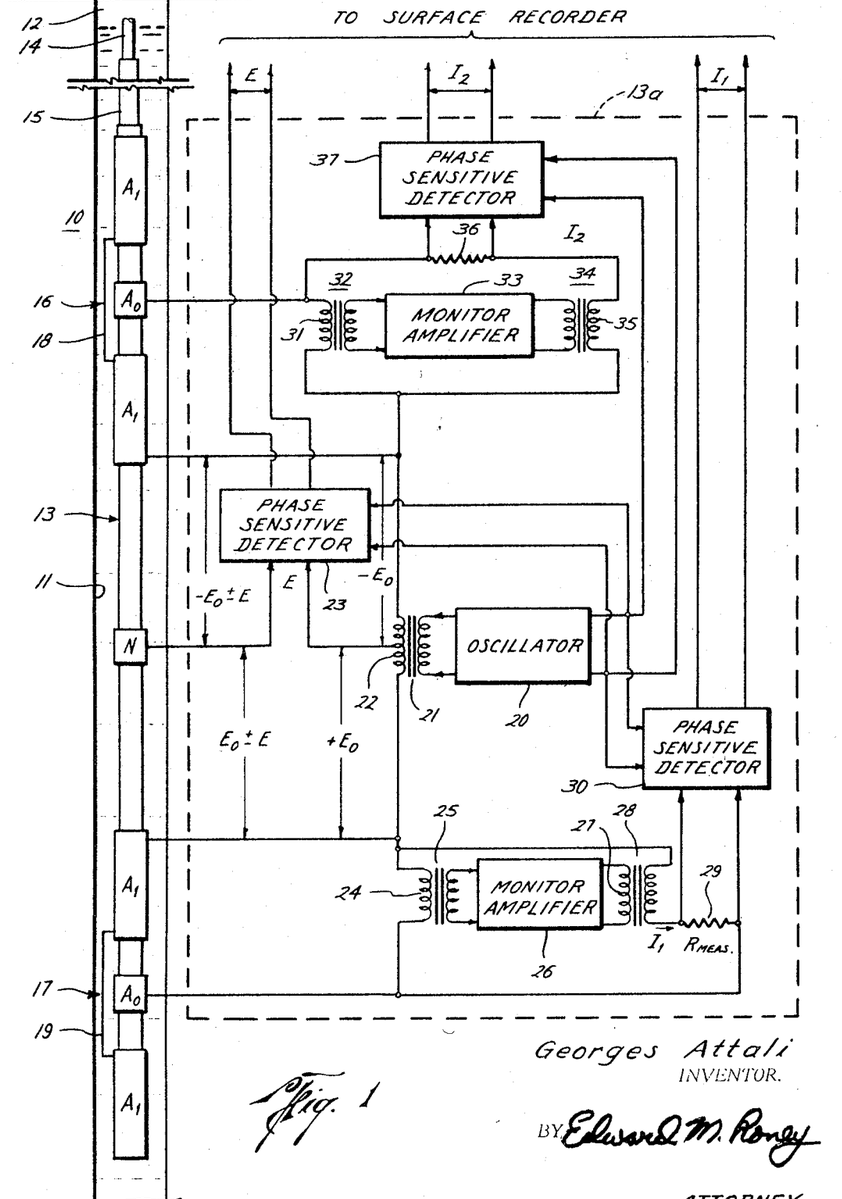
FIGURE 1 illustrates a representative embodiment of the earth formation investigating apparatus of the present invention in the borehole together with a schematic diagram of the electrical circuitry utilized with such embodiment.

Referring to FIGURE 1, there is shown a representative embodiment of apparatus constructed in accordance with the present invention for investigating subsurface earth formations 10 traversed by a borehole 11. Borehole 11 is filled with an electrically conductive drilling fluid 12, commonly referred to as "drilling mud." The investigating apparatus includes an investigating tool 13 which is supported on the end of an armored multiconductor cable 14 which extends to the surface of the earth. The investigating tool 13 is raised and lowered in the borehole 11 on the end of the armored multiconductor cable 14 by a reeling mechanism (not shown) at the surface of the earth. An insulation material 15 surrounds the lower 100 ft. or so of the armored multiconductor cable 14 above the investigating tool 13 and thus insulates the cable 14 from the drilling mud 12.

The investigating apparatus further includes a plurality of electrodes located on the investigating tool 13. The plurality of electrodes include an upper electrode array 16, a lower electrode array 17, and a potential reference electrode N located intermediate of upper and lower electrode arrays 16 and 17 and equal distance therebetween. Those portions of investigating tool 13 which do not constitute electrodes, have a suitable insulation material on the outer surface thereof. The dotted line box 13a represents portions of the interior of investigating tool 13 where the downhole electrical circuitry is contained.

Electrode arrays 16 and 17 both have a survey electrode $A_0$ for emitting survey current into the adjacent earth formations and focusing electrodes $A_1$ located on either side of survey electrode $A_0$ for emitting focusing current into the adjacent earth formations to confine the survey current to a path substantially perpendicular to the borehole axis. The focusing electrodes $A_1$ of electrode arrays 16 and 17 are connected together by conductors 18 and 19 respectively, so that both focusing electrodes $A_1$ on either side of survey electrode $A_0$ will be at the same potential in the particular electrode array.

The investigating apparatus also includes an oscillator 20, one of whose outputs is supplied across the primary winding of a transformer 21. One side of the secondary winding 22 of transformer 21 is connected to focusing electrode $A_1$ of upper electrode array 16, and the other side of the secondary winding 22 is conected to focusing electrode $A_1$ of lower electrode array 17. The center tap of secondary winding 22 and potential reference electrode N are connected across one input of a phase-sensitive detector 23. The input of phase-sensitive detector 23 has a very high impedance so that the center tap of secondary winding 22 and potential reference electrode N will not affect one another. Connected to the other input of phase-sensitive detector 23 is a phase-reference signal from oscillator 20. The output from phase-sensitive detector 23 is supplied to a recorder (not shown) at the surface of the earth through armored multiconductor cable 14. Survey electrodes $A_0$ and focusing electrode $A_1$ of lower electrode array 17 are connected across the primary winding 24 of a transformer 25. The secondary winding of transformer 25 is connected to the input of a monitor amplifier 26. The output of monitor amplifier 26 is supplied to the primary winding 27 of a transformer 28. One side of the secondary winding of transformer 28 is connected to focusing electrode $A_1$ of lower electrode array 17 and the other side of the secondary winding of transformer 28 is connected to one side of a measure resistor 29, the other side of measure resistor 29 being connected to survey electrode $A_0$ of lower electrode array 17. The input of a phase-sensitive detector 30 is connected across measure resistor 29. The phase-reference signal for phase-sensitive detector 30 is supplied from oscillator 20. The output from phase-sensitive detector 30 is supplied to the recorder at the surface of the earth via armored multiconductor cable 14.

In the upper electrode array 16, survey electrode $A_0$ and focusing electrode $A_1$ are connected across the primary winding 31 of a transformer 32. The secondary winding of transformer 32 is connected to the input of a monitor amplifier 33, the output of which is connected to the primary winding of a transformer 34. One side of the secondary winding 35 of transformer 34 is connected to focusing electrode $A_1$ of upper electrode array 16 and the other side of secondary winding 35 is connected to survey electrode $A_0$ of upper electrode array 16 through a measure resistor 36. The input of a phase-sensitive detector 37 is connected across measure resistor 36. The phase-reference signal for phase-sensitive detector 37 is supplied from oscillator 20. The output from phase-sensitive detector 37 is supplied to the recorder at the surface of the earth through armored multiconductor cable 14.

Now concerning the operation of the apparatus of FIGURE 1, the oscillator 20 supplies a signal to transformer 21 such that the voltage developed across the secondary winding 22 of transformer 21 is constant and equal to $2E_0$. The voltage developed between the center tap of the secondary winding 22 of transformer 21 and focusing electrode $A_1$ of lower electrode array 17 is equal to $+E_0$ and the voltage developed between the center tap of secondary winding 22 and the focusing electrode $A_1$ of upper electrode array 16 is equal to $-E_0$. If the difference in potential between potential reference electrode N and the center tap of secondary winding 22 is designated E, then the potential difference between potential reference electrode N and focusing electrode $A_1$ of lower electrode array 17 will be $E_0 \pm E$ and the difference in potential between potential reference electrode N and focusing electrode $A_1$ of upper electrode 16 will be $-E_0 \pm E$. The particular polarity designations shown in FIGURE 1 are set by the polarity of the signal applied from oscillator 20 to the phase-sensitive detectors which could be reversed, the important features being whether E adds or subtracts from the potential on the particular electrode array 16 or 17.

The polarity of the potential difference E between the center tap of secondary winding 22 and potential reference electrode N will vary depending on the surrounding earth formations, which will be described in connection with FIGURES 2-5. The output signal from phase-sensitive detector 23 will thus be a positive or negative DC signal proportional to that portion of the difference in potential E that is in-phase with the phase-reference signal supplied from oscillator 20.

The purpose of the circuitry comprising transformers 25 and 28, monitor amplifier 26, measure resistor 29, and phase-sensitive detector 30 is to maintain the lower survey electrode $A_0$ at the same potential as focusing electrode $A_1$ of lower electrode array 17 and to provide a signal indicative of the current supplied to survey electrode $A_0$ of lower electrode array 17. The difference in potential between survey electrode $A_0$ and focusing electrode $A_1$ of lower electrode array 17 is supplied to monitor amplifier 26 through transformer 25. Monitor amplifier 26 supplies sufficient current to transformer 28 to maintain survey electrode $A_0$ at the same potential as focusing electrode $A_1$. Thus, monitor amplifier 26 will provide an output current as long as there is a difference in potential between survey and focusing electrodes $A_0$ and $A_1$ of lower electrode array 17. This output current to survey electrode $A_0$ develops a voltage across measure resistor 29, which voltage is proportional to the current supplied to survey electrode $A_0$. Phase-sensitive detector 30 provides a DC output signal proportional to that portion of the voltage developed across measure resistor 29 which is in-phase with the phase-reference signal from oscillator 20. This in-phase survey current of lower electrode array 17 is designated $I_1$.

The circuitry comprising transformers 32 and 34, monitor amplifier 33, measure resistor 36 and phase-sensitive detector 37 performs an identical function with respect to the upper electrode array 16. That is, monitor amplifier 33 supplies sufficient output current through measure resistor 36 to upper survey electrode $A_0$ in response to the signal applied to transformer 32 to maintain the survey and focusing electrodes $A_0$ and $A_1$ at substantially the same potential. Phase-sensitive detector 37 then operates in the same manner as phase-sensitive detector 30, supplying a signal proportional to the in-phase portion of survey current supplied to upper electrode array 16, designated $I_2$, to the surface of the earth. The circuitry for maintaining the potentials of the survey and focusing electrodes substantially the same and measuring the current supplied to the survey electrode is only illustrative and other types of circuitry may be utilized such as, for example, the circuitry shown in U.S. Patent No. 3,031,612 granted to M. F. Easterling on Apr. 24, 1962.

It can be seen that both the upper electrode array 16 and the lower electrode array 17 are investigating surrounding earth formations at the same time, and also each electrode array is acting as the current return for the other electrode array. The conductivity measured by each electrode array will be proportional to the current emitted by the survey electrode $A_0$ divided by the voltage of the survey electrode with respect to zero potential. A DC signal proportional to current emitted from each of the survey electrodes $A_0$ is seen on the output of phase-sensitive detectors 30 and 37. The voltage on the survey electrodes of each electrode array is determined by the output voltage E of phase-sensitive detector 23 and the power supply voltage $E_0$. Since $E_0$ is constant, only the voltage E need be measured.

Thus, the signals supplied to the surface of the earth from the outputs of phase-sensitive detectors 23, 30 and 37 can be used to calculate the conductivity of the lower system, designated $\sigma_1$, and the conductivity of the upper system, designated $\sigma_2$, in accordance with the following equations:

$$\sigma_1 = \frac{1}{K} \frac{1}{+E_0 \pm E} I_1 \qquad (1)$$

$$\sigma_2 = \frac{1}{K} \frac{1}{-E_0 \pm E} I_2 \qquad (2)$$

where K is a constant coefficient of the system depending on several factors, such as electrode spacings, $I_1$ is the current supplied to survey electrode $A_0$ of lower electrode array 17, $I_2$ is the current supplied to survey electrode $A_0$ of upper electrode array 16. The survey current $I_2$ of upper electrode array 16 is a negative value (considering $I_1$ as positive), and thus, $I_2 = -|I_2|$, $I_2$ signifying the absolute value of $|I_2|$. $\sigma_1$ and $\sigma_2$ can be calculated downhole and transmitted to the surface of the earth or calculated at the surface of the earth, as will be shown later.

Figures 2, 3, 4:
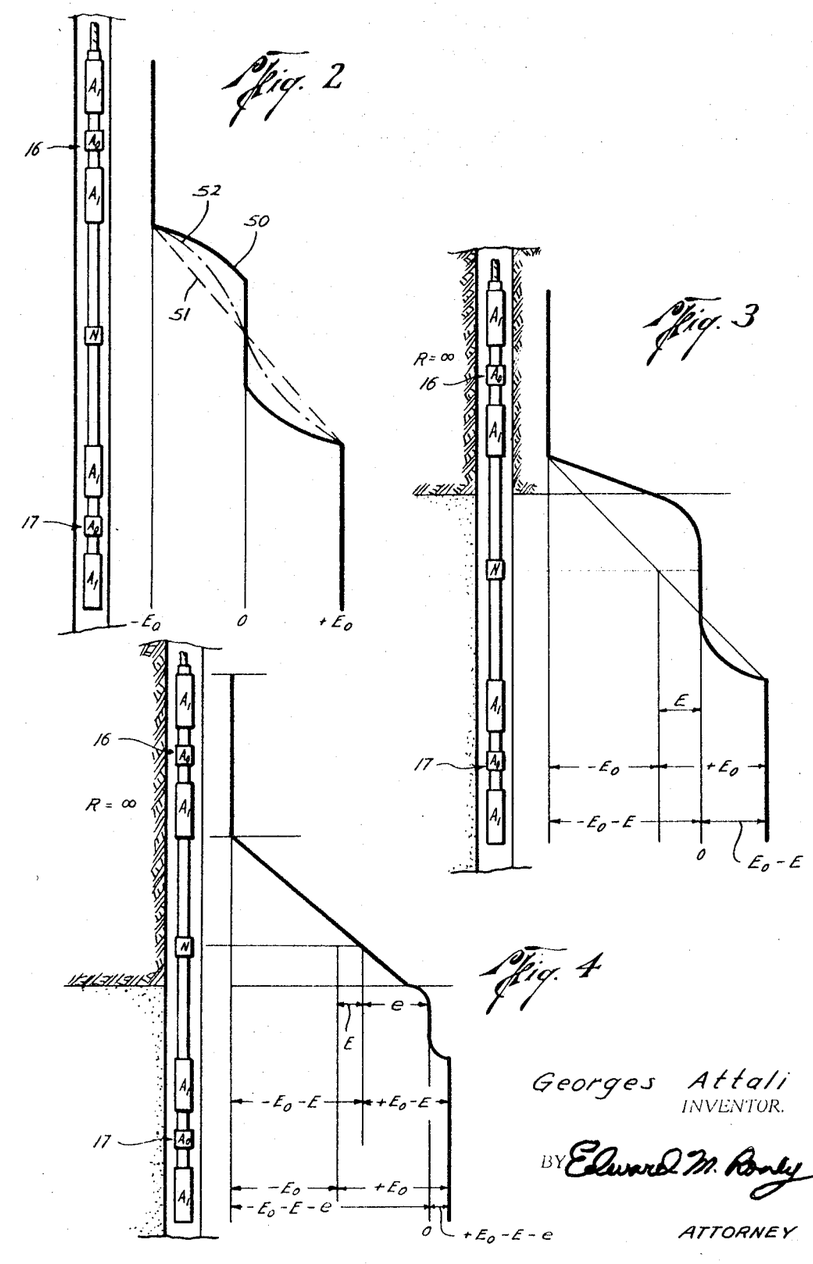
FIGURES 2, 3 and 4 represent plots of the potential at points in the earth formations adjacent to the investigating apparatus for various borehole conditions.

Looking now at FIGURE 2, there is shown a plot of representative potentials adjacent to the investigating tool 13 when investigating tool 13 is opposite a homogeneous formation. The solid line curve 50 represents the potential in a conductive type formation; the dotted line curve 51 represents the potential in a highly resistive formation; and the dot-dash curve 52 represents the potential in a formation having a resistivity somewhere between that of curves 50 and 51. It can be seen that in the conductive homogeneous formation, represented by curve 50, the potential will drop to zero at a relative short distance from each of the upper and lower electrode arrays 16 and 17. On the other hand, the potential in a highly resistive homogeneous formation, represented by curve 51, will vary in a substantially linear fashion between the upper and lower electrode arrays 16 and 17. In any event, all three curves will be at zero potentials at the potential reference electrode N in a homogeneous formation.

The center tap of secondary winding 22 of transformer 21 of FIGURE 1 will always be at a potential which is midway between $+E_0$ and $-E_0$. Thus, looking at FIGURE 2, it can be seen that the potential of potential reference electrode N is the same as the potential of the center tap of secondary winding 22, both of which are at zero potential. Thus, the voltage E applied to phase-sensitive detector 23 will be zero. Thus, in all homogeneous formations, Equations 1 and 2 can be rewritten as:

$$\sigma_1 = \frac{1}{KE_0} I_1 \quad (3)$$

$$\sigma_2 = \frac{1}{K(-E_0)} I_2 \quad (4)$$

Looking now at FIGURE 3, there is shown the same type of potential plot as in FIGURE 2, but in the FIGURE 3 case, the upper electrode array 16 is opposite a thick bed having infinite resistivity. In this case, the potential reference electrode N and the lower electrode array 17 are opposite a relatively conductive bed. It can be seen from the FIGURE 3 potential plot (the heavy line) that the potential at the potential reference electrode N is zero. However, the potential at the center tap of secondary winding 22 is not at zero potential due to the non-homogeneity of the earth formations opposite the investigating tool 13. Thus, there is a voltage difference E between potential reference electrode N and the center tap of secondary winding 22. Since the potential at the center tap is deemed the reference point for the determination of E, the polarity of E will be positive in the FIGURE 3 situation.

Thus, in the FIGURE 3 situation, the potential at the upper electrode array 16 will be equal to $-E_0-E$ with respect to the potential reference electrode N, which is at zero potential, and the potential at the lower electrode array 17 will be equal to $+E_0-E$ with respect to the potential reference electrode N. Thus, in the FIGURE 3 case, the conductivity $\sigma_1$ and $\sigma_2$ can be written as:

$$\sigma_1 = \frac{1}{K} \frac{1}{+E_0-E} I_1 \quad (5)$$

$$\sigma_2 = \frac{1}{K} \frac{1}{-(E_0+E)} I_2 \quad (6)$$

Thus, in the FIGURE 3 situation, the apparatus of FIGURE 1 will accurately provide conductivity indications by measuring the potential difference E between the potential reference N and the center tap of secondary winding 22 and the survey currents $I_1$ and $I_2$.

Now looking at FIGURE 4, there is shown the same type of potential plot as in FIGURES 2 and 3, but in this case, both the upper electrode arrays 16 and potential reference electrode N are opposite the thick, infinitely resistive formation. Only the lower electrode array 17 is opposite the conductive formation. In his case, it can be seen that the potential reference electrode N is not at zero potential. This difference in potential between zero potential and the potential of potential reference electrode N, designated $e$, will introduce an error into the conductivity indications since the potential reference electrode N is normally assumed to be at zero potential. Thus, the potential at the upper electrode array 16 with respect to zero potential will be equal to $-E_0-E-e$ and the potential of the lower electrode array 17 with respect to zero potential will be equal to $+E_0-E-e$. Thus, the conductivity $\sigma_1$ and $\sigma_2$ for the FIGURE 4 situation can be written as:

$$\sigma_1 = \frac{1}{K} \frac{1}{+E_0-E-e} I_1 \quad (7)$$

$$\sigma_2 = \frac{1}{K} \frac{1}{-(E_0+E+e)} I_2 \quad (8)$$

Thus, it can be seen that the assumption by the apparatus of FIGURE 1 that the potential reference electrode N is at zero potential will provide an error in the conductivity measurements.

It is to be noted that $e$ will have proportionately less effect on $\sigma_2$ than on $\sigma_1$. This can be seen from Equations 7 and 8 since $e$ is subtracted from $E_0-E$ in Equation 7, and added to $E_0+E$ in Equation 8.

FIGURES 3 and 4 have shown the situation where the lower electrode array 17 is in the conductive bed. When the situation reverses, that is, when the upper electrode array 16 is in the conductive bed and the lower electrode array 17 in the infinitely resistive bed, the potential plots shown in FIGURES 3 and 4 will reverse. That is to say, the polarity of the potential difference E between potential reference electrodes N and the center tap of secondary winding 22 will be negative instead of positive. The polarities of the detected potentials on the upper and lower electrode arrays 16 and 17 will remain the same, this polarity being determined by the phase of the phase-reference signal supplied to the respective phase-sensitive detectors.

Figures 5A, 5B:
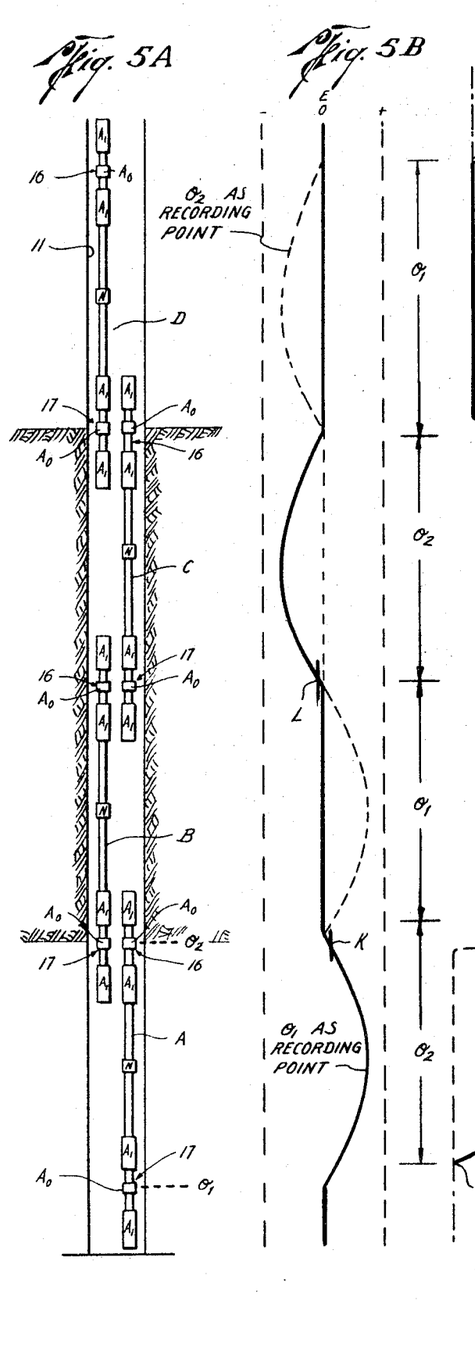
FIGURES 5A–5C show the investigating apparatus in the borehole with graphical representations of measurements obtained by the investigating apparatus in depth synchronism under varying borehole conditions.

Now referring to FIGURE 5A, there is shown an infinitely resistive formation sandwiched between two conductive formations. The investigating tool is shown in various locations throughout the borehole 11. In the position A, the investigating tool is mostly in the lower conductive bed with the survey electrode $A_0$ of upper electrode array 16 at the juction between the lower conductive bed and the infinitely resistive bed. In the position B, the investigating tool is mostly in the infinitely resistive bed with the survey electrode $A_0$ of lower electrode array 17 located at the junction between the lower conductive bed and the infinitely resistive bed. In the position C, the investigating tool is mostly in the infinitely resistive bed with the survey electrode $A_0$ of upper electrode array 16 at the junction between the infinitely resistive bed and the upper conductive bed. In the position D, the investigating tool is mostly in the upper conductive bed with the survey electrode $A_0$ of lower electrode array 17 at the junction between the infinitely resistive bed and the upper conductive bed.

Using survey electrode $A_0$ of lower electrode array 17 as the recording point or point of investigation, FIGURE 5b shows a plot of the potential difference E between potential reference electrode N and the center tap of secondary winding 22 of FIGURE 1. It can be seen from FIGURE 5b that E will be at zero so long as both the upper and lower electrode arrays 16 and 17 are in the same formation bed. This is the situation illustrated in FIGURE 2. However, when the upper and lower electrode arrays 16 and 17 are in different formation beds, E will differ from zero. When upper electrode array 16 enters the infinitely resistive bed, E will go positive and, by the same token, when upper electrode array 16 leaves the infinitely resistive bed and enters into the upper conductive bed, E will go negative. The reason for this has been explained in connection with FIGURES 3 and 4. The dotted line curve in FIGURE 5b represents the upper electrode array 16 as the recording point and thus is displaced from the solid line curve by a distance equal to the distance between the survey electrodes of upper and lower electrode arrays 16 and 17.

Figure 5C:
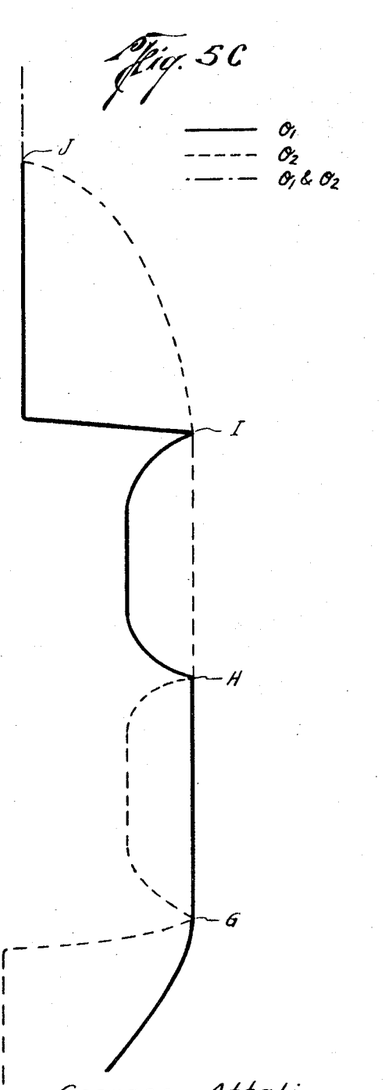

Looking at FIGURE 5c, there is shown a typical plot of the conductivity measured by upper and lower electrode arrays 16 and 17. The solid line curve represents $\sigma_1$, the dashed line curve represents $\sigma_2$, and the dot-dash curve represents $\sigma_1$ and $\sigma_2$ when they are equal. Of course, the curves of FIGURE 5c represent $\sigma_1$ and $\sigma_2$ at the same depth or investigating point. It can be seen from FIGURE 5c that when the investigating tool enters from the lower conductive bed into the infinitely resistive bed, $\sigma_1$ will not provide accurate readings of the conductivity between the points F and G in FIGURE 5c. However, when using $\sigma_2$ as the recording point, both the upper and lower electrode arrays 16 and 17 are in the same bed between the positions F and G in FIGURE 5c. Thus, $\sigma_2$ will be an accurate reading of conductivity between the positions F and G.

Now, when the upper electrode array 16 is in the infinitely resistive bed and the lower electrode array 17 is in the lower conductive bed, the conductivity readings may be in error. This represents the interval between the positions G and H in FIGURE 5c. During this interval G to H, both the upper and lower electrode arrays 16 and 17 will be in the same infinitely resistive bed when $\sigma_1$ is considered as the recording point. Thus, $\sigma_1$ will be accurate during the interval G to H. However, during the interval H to I, the lower electrode array 17 will be in the infinitely resistive bed and the upper electrode array 16 will be in the upper conductive bed thus causing $\sigma_1$ to be inaccurate during this interval. On the other hand, if $\sigma_2$ is considered as the recording point during the interval H to I, both the upper and lower electrode arrays 16 and 17 will be in the same infinitely resistive bed and thus, $\sigma_2$ will be accurate during this interval.

Now, between the interval I to J, $\sigma_2$ will be inaccurate since the upper electrode array 16 will be in the upper conductive bed and the lower electrode array 17 will be in the infinitely resistive bed if $\sigma_2$ is the recording point. On the other hand, $\sigma_1$ will be accurate during this interval I to J, since both the upper and lower electrode arrays 16 and 17 will be in the same upper conductive bed. From the point J and up, both $\sigma_1$ and $\sigma_2$ will be accurate.

Thus, it can be seen that a single continuous conductivity curve can be provided. This is accomplished by utilizing either $\sigma_1$ or $\sigma_2$ up to the point F, $\sigma_2$ only from the positions F to G, $\sigma_1$ only from the positions G to H, $\sigma_2$ only from the positions H to I, $\sigma_1$ only from the positions I to J, and either $\sigma_1$ or $\sigma_2$ from the positions J upward. Of course, if the infinitely resistive bed were thicker than shown in FIGURE 5a, both $\sigma_1$ and $\sigma_2$ would be accurate during the interval when both the upper and lower electrode array 16 and 17 were in the infinitely resistive bed.

Figure 6:
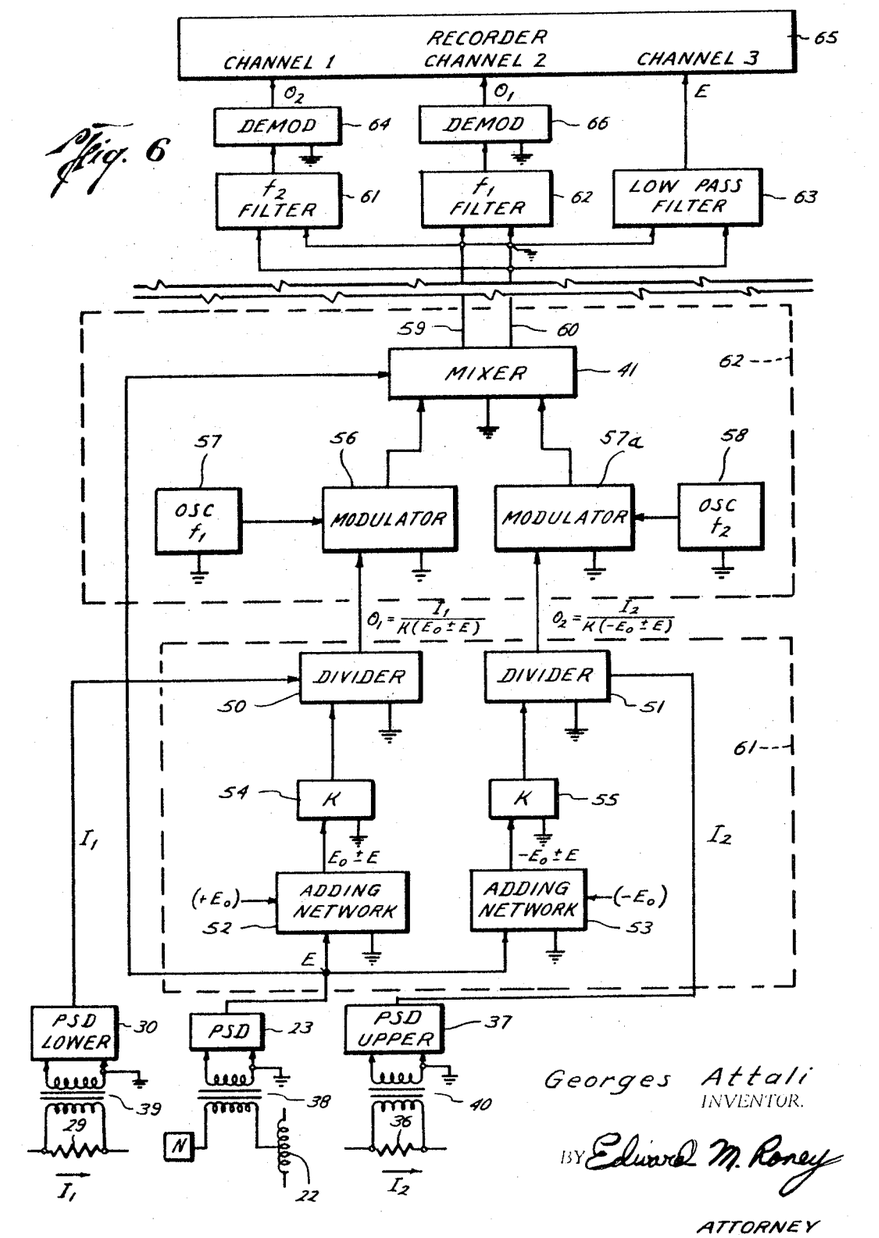
FIGURE 6 represents schematically a representative circuit to be used with the apparatus of FIGURE 1 for computing the values of conductivity and transmitting the indications to the surface of the earth.

Now looking at FIGURE 6, there is shown a representative example of circuitry utilized to calculate the values of $\sigma_1$ and $\sigma_2$ and to transmit $\sigma_1$, $\sigma_2$ and E to the surface of the earth over one conductor pair. Phase-sensitive detectors 23, 30 and 37, measure resistors 29 and 36, potential reference electrode N and secondary winding 22 are the same as the identically numbered elements in FIGURE 1. The circuitry for providing the output signals from phase-sensitive detectors 23, 30 and 37 are the same as in FIGURE 1 and will not be discussed in connection with FIGURE 6. In the FIGURE 6 apparatus, transformers 38, 39 and 40 have been added to the inputs of phase-sensitive detectors 23, 30 and 37 respectively so that the secondary windings thereof may be connected to a common reference potential, which is necessary for calculating the values of conductivity. Alternatively, differential amplifiers could be utilized to supply a common reference potential. The input impedance of phase-sensitive detector 23 reflected to the primary winding of transformer 38 should be very high so that the impedance between potential reference electrode N and the center tap of secondary winding 22 will be high.

The output of phase-sensitive detector 30, which is representative of $I_1$, is supplied to the dividend input of a divider or ratio circuit 50. The output of phase-sensitive detector 37, which is representative of $I_2$, is supplied to the dividend input of a divider or ratio circuit 51. The output of phase-sensitive detector 23, which is representative of E, is supplied to the inputs of an adding network 52, an adding network 53, and one input of mixer circuit 41. The other input to adding network 52 is connected to a constant DC potential which is proportional to $+E_0$ and the other input to adding network 53 is connected to a negative DC potential proportional to $-E_0$.

The output from adding network 52 is supplied to a constant gain circuit 54, whose gain is equal to the constant coefficient K of the electrode system. The output from constant gain circuit 54 is supplied to the divisor input of divider or ratio circuit 50. The output from adding network 53 is supplied to a constant gain circuit 55, having the same gain as constant gain circuit 54, the output of constant gain circuit 55 being supplied to the divisor input of divider or ratio circuit 51. The output from divider circuit 50 is supplied to the modulation input of a modulator 56, the carrier signal being supplied from an oscillator 57 operating at a first frequency $f_1$. The output from divider circuit 51 is supplied to the modulation input of a modulator 57, the carrier signal to modulator 57 being supplied from an oscillator 58 operating at a second frequency $f_2$. Both $f_1$ and $f_2$ are substantially higher than the maximum frequency of E.

The output from modulators 56 and 57 are supplied to separate inputs of mixer 41 along with the output signal E from phase-sensitive detector 23. The purpose of mixer 54 is to combine the input signals together while isolating the outputs of the various input circuits from one another. The output from mixer 41 is supplied to the surface of the earth via conductors 59 and 60 which travel through the armored multiconductor cable 14 of FIGURE 1. The conductor 60 is tied to a common reference point at the surface of the earth. Conductors 59 and 60 are supplied to the inputs of a filter 61 which passes the frequency $f_2$, filter 62 which passes the frequency $f_1$, and low-pass filter 63 which passes the output signal from phase-sensitive detector 23. The output signal from filter 61 is supplied to a demodulator 64, whose output is supplied to a channel 1 of a recorder 65. The output from filter 62 is supplied to a demodulator 66, whose output signal is supplied to a channel 2 of recorder 65. The output from low-pass filter 63 is supplied to a channel 3 of recorder 65.

Now concerning the operation of the FIGURE 6 apparatus, the adding networks 52 and 53 add or subtract the output signal E from phase-sensitive detector 23 to the DC voltage $+E_0$ or $-E_0$ respectively, the polarity of E determining whether E is subtracted or added. The output of adding network 52 will then be $E_0 \pm E$ and the diviser input signal to divider circuit 50 will then be $K(E_0 \pm E)$. The output from divider circuit 50 will be a varying DC signal proportional to $\sigma_1$. Likewise, the divisor input signal to the divider 51 will be proportional to $K(E_0 \pm E)$ and the output signal from divider circuit 51 will be a varying DC signal proportional to $\sigma_2$. The downhole modulation circuit 62 represents a standard amplitude modulation system and the filter and demodulation circuitry at the surface of the earth is likewise of a standard type.

Figure 7:
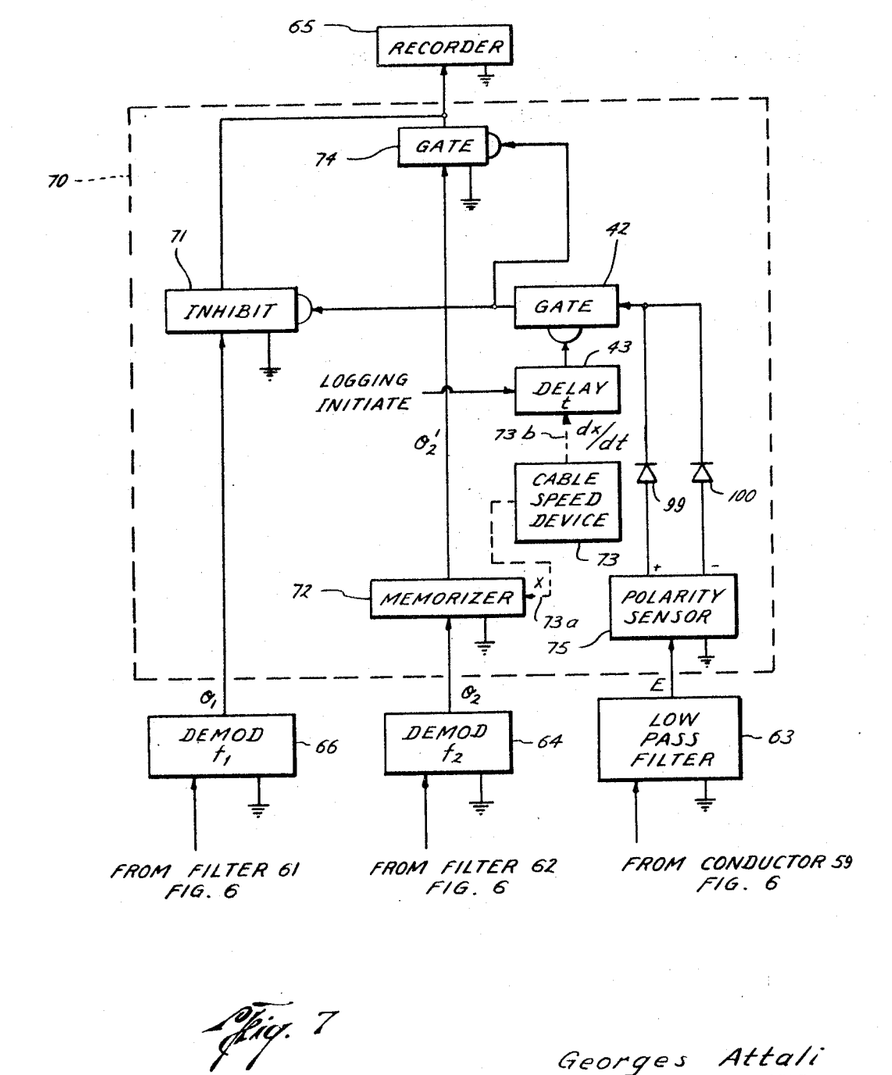
FIGURE 7 represents schematically a representative circuit for providing a single plot of the conductivity of the surrounding earth formations.

Looking now at FIGURE 7, there is shown a system for providing a single conductivity curve to recorder 65 from the apparatus of FIGURE 6. The gating and control circuitry shown within apparatus 70 performs this function. The output signals $\sigma_1$, $\sigma_2$ and E from demodulators 66 and 64 and low-pass filter 63, respectively, are the same signals that are applied to recorder 65 in FIGURE 6. However, in the FIGURE 7 apparatus, the gating and control apparatus 70 automatically supplies recorder 65 the correct conductivity, $\sigma_1$ or $\sigma_2$, by utilizing the principles established earlier in connection with FIGURE 5c.

The output from demodulator 66, representative of $\sigma_1$, is supplied to an inhibit gate 71, whose output is supplied to one channel of recorder 65. The output from demodulator 64 is supplied to the input of a memorizer 72. Memorizer 72 is a standard drum type or equivalent recorder in which the signal is recorded continuously on the rotating drum. One revolution of the rotating drum corresponds to the distance between the survey electrodes $A_0$ of lower electrode array 17 and upper electrode array 16, i.e. $\sigma_1$ and $\sigma_2$. At the end of one revolution of the rotating drum, the value of $\sigma_2$ recorded one revolution earlier is erased and the new value of $\sigma_2$ recorded.

Since the speed of the investigating tool in the borehole may not always be uniform, the speed of rotation of the rotating drum of memorizer 72 should be the same as the rate of travel of the cable in and out of the borehole. Thus, a cable speed device 73 is shown mechanically coupled via shaft 73a to drive the rotating drum of memorizer 72 to drive the rotating drum therein, shaft 73a being representative of the displacement X of the cable. The output pick up from memorizer 72 is at a point on the rotating drum corresponding to one rotational delay, i.e., just before the erase means of memorizer 72. Thus, the output from memorizer 72, designated $\sigma_2'$, will correspond to $\sigma_2$ at the depth point corresponding to $\sigma_1$. This output signal from memorizer 72 is applied to a gate circuit 74, the output of gate circuit 74 being applied to the one channel of recorder 65.

The output E from low-pass filter 63 provides a signal on the + output of polarity sensor 75 through diode 99 when E is positive and provides a signal on the — output through diode 100 when E is negative. Diodes 99 and 100 isolate the + and — outputs of polarity sensor 75 from one another. The circuit could comprise, for example, a pair of Schmitt triggers biased to trigger at the desired levels. Either the + or — output from polarity sensor 75, if either one is present, is supplied to a gate 42, the output of gate 42 being supplied to the control terminals of inhibit circuit 71 and gate circuit 74 since a test for E≠0 is required here. A shaft 73b from cable speed device 73 is mechanically coupled to a delay circuit 43 to vary the time delay of delay 43 by suitable means, as for example, by varying a resistor or capacitor in the timing circuit of delay 43. The shaft 73b is proportional to the rate of cable travel $dx/dt$, which is accomplished in cable speed device 73 by suitable means. The delay time of delay 43 is equal to the time that it takes survey electrode $A_0$ of lower electrode array 17 to travel a distance equal to the distance between recording points $\sigma_1$ and $\sigma_2$. This time is designated $t$. Delay 43 is energized by a "logging initiate" signal which is a constant signal representing the initiation of the logging operation, moving tool 13 up the borehole. Inhibit circuit 71 will allow $\sigma_1$ to pass until such time as a signal is present at the control terminal, while gate circuit 74 only allows $\sigma_2'$ to pass when a signal is present on the control terminal thereof.

Looking now at FIGURE 5 and FIGURE 7 together, it can be seen that $\sigma_1$ is recorded by recorder 65 when E is substantially at zero volts. The trigger levels of polarity sensor 75 could be set at levels corresponding to K and L in FIGURE 5b to guard against inadvertent triggering of polarity sensor 75. If E is zero at the bottom of the borehole, the earth formations surrounding the bottom portion of the borehole will be recorded by lower electrode array 17. $\sigma_1$ will continue to be recorded until such time as the investigating tool is in the position A of FIGURE 5a, since at this point, E begins going positive. At or near this point, polarity sensor 75 will provide an output signal on the + output which will inhibit $\sigma_1$ from reaching the recorder 65 and allow $\sigma_2'$ to pass to recorder 65. This has the affect of recording the dotted line curve $\sigma_2$ of FIGURE 5c between positions F and G.

If however, the earth formations surrounding the bottom of the borehole are not homogeneous, E may not be zero. However there is not a reading for $\sigma_2'$ yet because of the delay produced by memorizer 72. Thus, $\sigma_1$ should be recorded regardless of the value of E for the interval for the lower electrode array 17 to travel to the point where the upper electrode array 16 was when the logging operation began. This is the purpose of delay 43 and gate 42. Gate 42 is kept de-energized until the "logging initiate" signal enables gate 42 after the time period $t$, during which time only $\sigma_1$ can be recorded since inhibit gate 71 or gate 74 can not be energized. After the time $t$, gate 42 is energized from delay 43 and polarity sensor 75 is free to control gate 74 and inhibit gate 71.

When investigating tool 13 is at or near the position B of FIGURE 5, E will return to zero volts thus removing the output signal from polarity sensor 75, and allowing $\sigma_1$ to again be recorded by recorder 65. This has the effect of recording the solid line curve $\sigma_1$ between the positions G and H. In the position C, E will be negative, which again will record $\sigma_2'$ into recorder 65. This has the effect of recording the dotted line curve $\sigma_2$ between the positions H and I of FIGURE 5c by recorder 65. At the position D of FIGURE 5a, E will again return to zero volts, thus allowing $\sigma_1$ to be recorded by recorder 65, which has the effect of recording the solid line curve $\sigma_1$ between the positions I and J. Thus, it can be seen that one accurate conductivity curve can be recorded into one channel of recorder 65 by the above described means.

Figure 8:
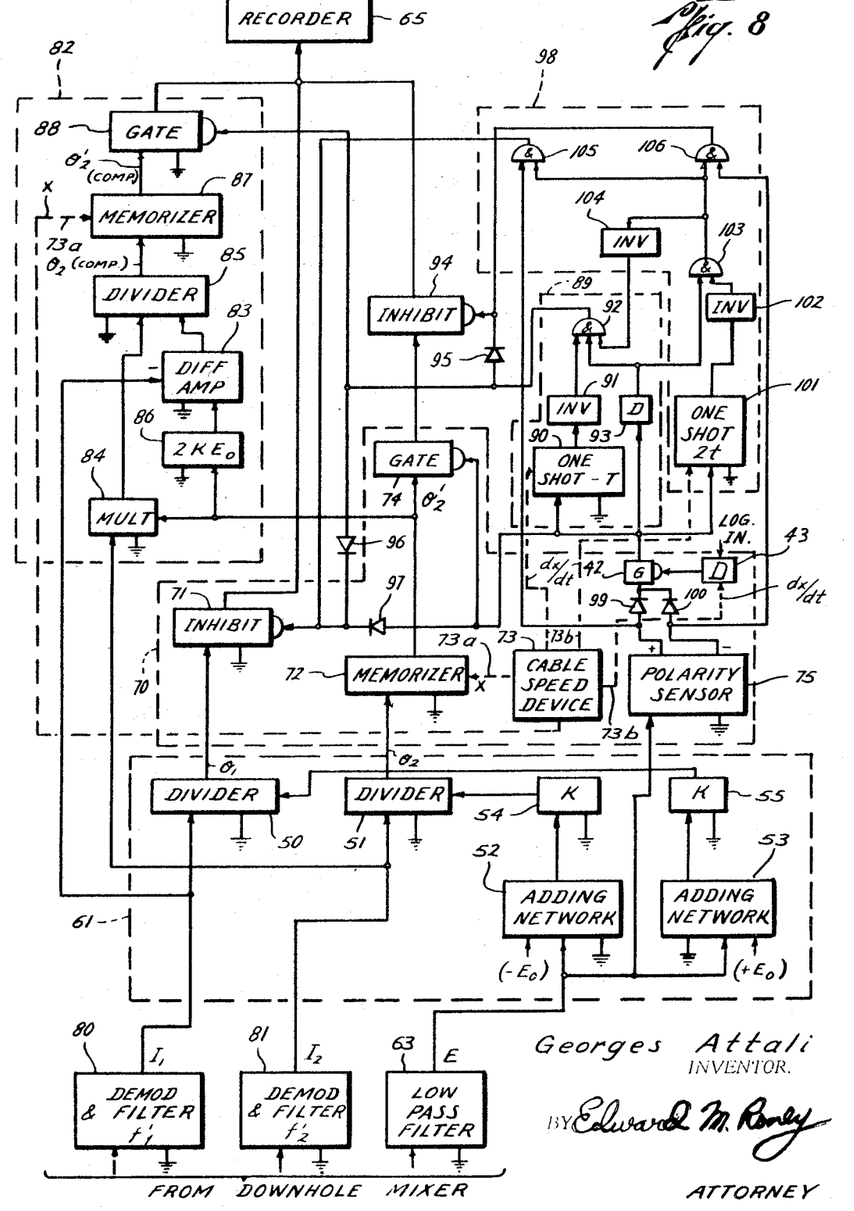
FIGURE 8 shows schematically a representative circuit for providing a single plot of the surrounding earth formations under all borehole conditions, including extreme conditions.

Looking now at FIGURE 8, there is shown apparatus for providing a single plot on a single channel of recorder 65 of the conductivity of the surrounding earth formations under various types of extreme borehole conditions. In FIGURE 8, signals proportional to the survey currents $I_1$ and $I_2$ of the lower and upper survey electrodes $A_0$ respectively, are transmitted to the surface of the earth along with the voltage E. The modulation and demodulation circuitry is similar to that of FIGURE 6 and will not be discussed in connection with FIGURE 8. Thus, in the FIGURE 8 apparatus, the outputs from phase-sensitive detectors 23, 30 and 37 of FIGURE 1 are transmitted to the surface of the earth.

The circuitry 61 for calculating $\sigma_1$ and $\sigma_2$ is located at the surface of the earth rather than downhole and having already been discussed in connection with FIGURE 6, will not be discussed here. The circuitry contained within the dotted line box 70 in FIGURE 7 is also present in the FIGURE 8 apparatus and likewise will not be discussed here. Thus, in FIGURE 8, the output $\sigma_2'$ from gate 74 and the output $\sigma_1$ from inhibit circuit 71 are identical in purpose and function with the similarly designated circuitry in FIGURE 7.

However, if the infinitely resistive bed has a fairly narrow thickness so that the upper and lower electrode arrays 16 and 17 will not be in the infinitely resistive bed at the same time, the circuitry of FIGURE 7 may provide erroneous conductivity readings for the reasons discussed earlier. In otherwords, $\sigma_2'$ will provide accurate readings up to the junction between the lower conductive bed and the infinitely resistive bed, but the subsequent $\sigma_1$ measurements may be in error in this case since both the upper and lower electrode arrays 16 and 17 are not in the same bed.

To solve this problem, a value of $\sigma_2$ can be computed which will provide accurate results. This computed relationship is determined by factoring the relationship $(E+e)$ out of Equations 7 and 8, and arriving at the result:

$$\sigma_2(\text{Comp.}) = \frac{(+|I_2|)\sigma_1}{2KE_0\sigma_1 - I_1} \qquad (9)$$

Thus, by knowing the true value of $\sigma_1$, the value of $\sigma_2$ can be computed. However, when the investigating tool is in such a relatively narrow bed, both $\sigma_1$ and $\sigma_2$ may be reading inaccurately, since both the upper and lower electrode arrays 16 and 17 are not in the same bed. However, the delayed $\sigma_2$ reading ($\sigma_2'$) will be accurate since both the upper and lower electrode arrays 16 and 17 were in the same bed when $\sigma_2'$ was being measured and memorized by memorizer 72. Thus, $\sigma_2'$ can be substituted for $\sigma_1$ in Equation 9 to obtain an accurate value of the computed value of $\sigma_2$, designated $\sigma_2(\text{Comp.})$. Thus, Equation 9 can be rewritten:

$$\sigma_2(\text{Comp.}) = \frac{+|I_2|\sigma_2'}{2KE_0\sigma_2' - I_1} \qquad (10)$$

The circuitry for providing an indication of $\sigma_2(\text{Comp.})$ is designated 82 in FIGURE 8. The signal from demodulator and filter 80, proportional to $I_1$, is supplied to one input of a differential amplifier 83. The output from demodulator and filter 81, proportional to $I_2$, is supplied to one input of a multiplier circuit 84. The output $\sigma_2'$ from memorizer 72 is supplied to the other input of multiplier circuit 84, the output from multiplier circuit 84 being supplied to the dividend input of a divider or ratio circuit 85. The output signal $\sigma_2'$ from memorizer 72 is also supplied to a constant gain circuit 86 having a gain equal to $2KE_0$. The output from fixed gain circuit 86, which is proportional to $2KE_0\sigma_2'$, is applied to the other input of differential amplifier 83. The output signal from demodulator and filter 80, which is representative of $I_1$, is subtracted from the output signal from fixed gain circuit 86. The output signal from differential amplifier 83, which is proportional to $2KE_0\sigma_2'=I_1$, is applied to the divisor input of divider circuit 85. The output from divider circuit 85, which is proportional to $\sigma_2$(Comp.), is applied to a memorizer 87. Memorizer 87 is identically the same as memorizer 72, described earlier, and is driven by shaft 73a from the cable speed device 73 in the same manner. The purpose of memorizer 87 is to shift the $\sigma_2$(Comp.) signal to the $\sigma_1$ recording point, which is the recording point used throughout the borehole. The depth shifted $\sigma_2$(Comp.) signal, designated $\sigma_2'$(Comp.) is applied to the input of a gate circuit 88.

Now concerning the logic circuitry for determining when $\sigma_2'$(Comp.) should be supplied to recorder 65, it will be known that the formation bed is thin enough to require $\sigma_2'$(Comp.) if either the + or − output of the polarity sensor 75 is energized for a time period greater than the length of time required for the investigating tool 13 to travel from the position A to the position B in FIGURE 5a. This length of time is designated $t$. Thus, the + and − outputs from polarity sensor 75 are supplied to a monostable multivibrator or one-shot 90 through forward biased diodes 99 and 100 respectively, one-shot 90 having a pulse width equal to $t$. Since the cable speed varies, the $dx/dt$ (rate) shaft 73b of the cable speed device 73 is mechanically coupled to one-shot 90 to vary the pulse width of one-shot 90 in a suitable manner, for example, by varying a resistor or capacitor in the timing portion of one-shot 90. The output of one-shot 90 is supplied to an inverter 91, whose output is supplied to one input of an AND gate 92. Another input of AND gate 92 is supplied from a delay circuit 93, whose input is supplied from the + and − output terminals of polarity sensor 75. The purpose of delay circuit 93 is to make sure that AND gate 92 is not inadvertently energized due to delays in one-shot 90 and inverter 91. The output of AND gate 92 is supplied to the control input of an inhibit circuit 94 through a forward biased diode 95, to the control terminal of gate circuit 88, and to the control terminal of inhibit circuit 71 through a forward biased diode 96. The + and − outputs of polarity sensor 75 are also supplied to the control input of inhibit circuit 71 through a forward biased diode 97. The purpose of diodes 95, 96 and 97 is to keep the various logic circuits from interacting with one another.

It can be seen that AND gate 92 will remain unenergized until such time that polarity sensor 75 provides an output signal for a length of time greater than $t$. When the time duration of the output from polarity sensor 75 exceeds $t$, AND gate 92 energizes inhibit circuit 94 and inhibit circuit 71, thus not allowing the recording of either $\sigma_1$ or $\sigma_2'$. The AND gate 92 also energizes gate 88, thus allowing $\sigma_2'$ (Comp.) to be recorded by recorder 65.

In addition to the borehole conditions already discussed, there may exist a series of narrow formation beds or fractures which may cause $\sigma_1$, $\sigma_2'$ and $\sigma_2'$ (Comp.) to be inaccurate. The reason for this is that if the series of narrow formation beds or fractures extend for a great enough distance, there would not be an accurate conductivity measurement that could be substituted into Equation 9 for $\sigma_1$. However, it is known that if the difference in potential E between potential reference electrode N and the center tap of secondary winding 22 is negative, then the upper electrode array 16 ($\sigma_2$) will provide a more accurate reading, and if E is positive, then the lower electrode array 17 ($\sigma_1$) will be more accurate. The logic circuitry shown within the dotted line box 98 will determine when this last-named condition occurs and switch between $\sigma_1$ and $\sigma_2'$ accordingly.

It is known that if E is positive or negative (i.e., non-zero) for a time duration exceeding $2t$, and $\sigma_2'$ (Comp.) signal may be inaccurate. That is to say, when the output of polarity sensor 75 is energized for a time period exceeding $2t$, then there is no accurate conductivity measurement to substitute into Equation 9 for $\sigma_1$. This is because $\sigma_2$ will not have been recorded when both the upper and lower electrode arrays 16 and 17 were in a homogeneous bed so as to obtain an accurate value of $\sigma_2'$ to be substituted in Equation 9 for $\sigma_1$ if E is non-zero for a time period exceeding $2t$. However, as was discussed earlier, a reasonably accurate conductivity reading can be obtained by recording $\sigma_2'$ when E is negative, and recording $\sigma_1$ when E is positive. The circuitry contained within dotted line box 98 performs this function of determining when E is positive or negative for a period exceeding $2t$, inhibiting $\sigma_2'$ (Comp.) and at the same time, switching between $\sigma_1$ and $\sigma_2'$ depending on the polarity of E.

The positive and negative outputs from polarity sensor 75 are supplied to the input of a one-shot 101 through the forward biased diodes 99 and 100 respectively, one-shot 101 having a time duration of $2t$. Shaft 73b $(dx/dt)$ of cable speed device 73 is connected to one-shot 101 so that the time duration $2t$ will correspond with the cable speed. The output of one-shot 101 is supplied to the input of an inverter circuit 102, the output of which is supplied to one input of AND gate 103. The other input to AND gate 103 is supplied from the output of delay circuit 93. The output from AND gate 103 is supplied to the inputs of an inverter circuit 104, an AND gate 105, and an AND gate 106. The output of inverter circuit 104 is supplied to one input of AND gate 92. The negative terminal of polarity sensor 75, on the anode side of diode 100, is supplied to the other input of AND gate 106, and the positive terminal of polarity sensor 75, on the anode side of diode 99, is supplied to the other input of AND gate 105. The output from AND gate 106 is supplied to the control terminal of inhibit circuit 94 and the output from AND gate 105 is supplied to the control terminal of inhibit circuit 71.

The one-shot 101 will become energized whenever E goes positive or negative and will provide an output at a time $2t$ after E goes positive or negative. AND gate 103 will remain deenergized until the time duration $2t$ has passed, and then will only become energized if there is still an output signal from polarity sensor 75. If there is such an output from polarity sensor 75 after a time duration $2t$ has passed, the output from AND gate 103 will de-energize AND gate 92 which inhibits $\sigma_2'$ (Comp.) from reaching recorder 65 through gate circuit 88. The output from AND gate 103 will also enable AND gates 105 and 106. AND gate 105 will be energized then if E is positive, which inhibits $\sigma_1$ from reaching recorder 65 through inhibit gate 71. Thus, if E is positive, only $\sigma_2'$ will reach recorder 65. On the other hand, if E is negative, AND gate 106 will be energized, thus inhibiting $\sigma_2'$ from reaching recorder 65 through inhibit gate 94 and allowing $\sigma_1$ to pass to recorder 65. As soon as the output of polarity sensor 75 drops to zero, thus signifying that the upper and lower electrode arrays 16 and 17 are in the same formation bed, AND gate 103 will be de-energized and $\sigma_1$ will again be recorded in recorder 65.

It can be seen that through the apparatus of the present invention, the conductivity of the surrounding earth formations can be determined under most typical borehole conditions including very severe conditions. The various logic functions shown in FIGURE 8 can be used separately rather than in the combination shown in FIGURE 8. For example, $\sigma_2'$ (Comp.) alone could be supplied to recorder 65 or could be supplied to a separate channel of recorder 65, or not used at all. Likewise, the function performed by logic circuits 98 or 89 could be individually or jointly utilized or not utilized in combination with the apparatus of FIGURE 8 or the function performed by logic circuit 98 could be utilized alone to supply conductivity measurements to recorder 65. Also, recorder 65 could be rerun after a logging run to utilize Equation 9 to solve for $\sigma_1$ instead of $\sigma_2$. The particular combination of functions to be supplied to recorder 65 would depend on the type of borehole conditions encountered. Additionally, in FIGURE 1, instead of having a constant voltage $2E_0$ developed across the secondary winding 22 of transformer 21, a constant current could be utilized instead.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. In well logging apparatus for investigating earth formations surrounding a borehole, the combination comprising:
    (a) a plurality of electrodes adapted for movement through the borehole, the electrodes including:
        (1) a first electrode array, at least one electrode of which is adapted to emit current into the surrounding earth formations for investigating the earth formations surrounding said first electrode array;
        (2) a second electrode array, at least one electrode of which is adapted to emit current into the surrounding earth formations for investigating the earth formations surrounding said second electrode array;
        (3) a potential reference electrode;
    (b) first means for supplying current between at least one electrode of the first and second electrode arrays for emission into the surrounding earth formations, the current passing through the earth formations between the electrode arrays; and
    (c) second means coupled to the potential reference electrode and the first means and simultaneously responsive to the current individually emitted by at least one electrode of both the first and second electrode arrays and to the potential on said potential reference electrode for providing indications of the conductivity of the surrounding earth formations.

2. The apparatus of claim 1 wherein the second means includes:
    (1) means coupled to the potential reference electrode and responsive to at least a portion of the current emitted by the first electrode array for providing a first indication of the conductivity of the earth formations opposite the first electrode array; and
    (2) means coupled to the potential reference electrode and responsive to at least a portion of the current emitted by the second electrode array for providing a second indication of the conductivity of the earth formations opposite the second electrode array.

3. The apparatus of claim 1 wherein the potential reference electrode is located intermediate of the two electrode arrays.

4. The apparatus of claim 2 wherein:
    (1) the first and second electrode arrays each include a survey electrode for emitting survey current and at least one focusing electrode for emitting focusing current to focus the survey current in a desired flow pattern;
    (2) the first means includes:
        (a) means for supplying current to said at least one focusing electrode of both electrode arrays; and
        (b) means for maintaining the potential of the survey electrode substantially the same as said at least one focusing electrode for each electrode array; and
    (3) the current of each electrode array that the second means is responsive to is the survey current emitted by the survey electrode of each electrode array.

5. The apparatus of claim 2 wherein the potential reference electrode is located intermediate of the two electrode arrays and
    (1) the first means also supplies a center potential which is subtsantially midway between the potentials of said at least one electrode of each electrode array; and
    (2) the second means is responsive:
        (a) to the difference in potential E between the center potential and the potential of the potential reference electrode; and
        (b) to the current supplied to at least one electrode of each electrode array.

6. The apparatus of claim 5 wherein the peak potential of said at least one electrode of each electrode array is maintained constant with respect to the center potential.

7. The apparatus of claim 2 and further including third means coupled to the second means for providing an output signal indicative of which of the two conductivity indications is more accurate.

8. The apparatus of claim 5 and further including third means responsive to the difference in potential E for detecting which of the two conductivity indications is more accurate and producing an output signal indicative thereof.

9. The apparatus of claim 8 and further including:
    (1) recorder means; and
    (2) fourth means responsive to the output signal from the third means for supplying the correct conductivity indication to the recorder means.

10. The apparatus of claim 1 and further including computing means coupled to the second means for computing the conductivity of the earth formations surrounding a first one of the electrode arrays in response to measurements of the conductivity surrounding the other of said electrode arrays and to a measure of at least part of the current emitted from each of said first and second electrode arrays.

11. The apparatus of claim 10 wherein the computing means includes means for memorizing the conductivity indications of said first one of the electrode arrays and utilizing the memorized conductivity indications in place of the conductivity surrounding the other of said electrode arrays for computing the conductivity surrounding said first one of the electrode arrays.

12. The apparatus of claim 9 and further including:
    (1) means coupled to the second means for computing the conductivity of the earth formations surrounding a first one of the electrode arrays in response to measurements of the conductivity surrounding the other of said electrode arrays and to a measure of at least a part of the current emitted from each of said first and second electrode arrays; and
    (2) means responsive to the potential difference E for determining when both the first and second conductivity indications are inaccurate and supplying the computed conductivity indication to the recorder means in place of the first and second conductivity indications.

13. The apparatus of claim 12 and further including means responsive to the potential difference E for determining when the first, second, and computed conductivity indications are inaccurate and determining which one of the first and second conductivity indications are more accurate and supplying said more accurate conductivity indication to the recorder means.

14. Apparatus for investigating earth formations surrounding a borehole, comprising:
   (a) current supply means for generating current;
   (b) first exploring means having at least one electrode for emitting current into a formation in response to at least a portion of the generated current and deriving a measure of an electrical parameter associated with said at least one electrode of the first exploring means;
   (c) second exploring means having at least one electrode for emitting current into a formation in response to at least a portion of the generated current and deriving a measure of an electrical parameter associated with said at least one electrode of the first exploring means;
   (d) a potential reference electrode located intermediate of said at least one electrode of said first and second exploring means;
   (e) means for comparing the potential on said potential reference electrode with a reference potential derived from the current supply means to produce an output signal representative of the condition of a formation adjoining said first and second exploring means; and
   (f) means responsive to the measurements of the electrical parameters associated with the first and second electrode arrays and said output signal for producing measurements of the formation conductivity proximate to at least one of the first or second electrode arrays.

15. The apparatus of claim 14 wherein the means for producing formation conductivity measurements includes means responsive to the electrical parameter measurement associated with said first exploring means and to said output signal for producing a first conductivity measurement of a formation proximate to said first exploring means, means responsive to the electrical parameter measurement associated with said second exploring means and to said output signal for producing a second conductivity measurement of a formation proximate to said second exploring means, and means responsive to said output signal for determining the relative accuracy of said first and second conductivity measurements to thereby enable a record to be made of the true formation conductivity.

16. In well logging apparatus for investigating earth formations surrounding a borehole, the combination comprising:
   (a) a plurality of electrodes adapted for movement through the borehole, the electrodes including:
      (1) a first focused electrode array having at least one survey and one focusing electrode which are adapted to emit current into the surrounding earth formations;
      (2) a second focused electrode array having at least one survey and one focusing electrode which are adapted to emit current into the surrounding earth formations;
      (3) a potential reference electrode located intermediate the two electrode arrays;
   (b) first means for supplying current between the electrode arrays, the current passing through the earth formations between the electrode arrays;
   (c) means associated with each electrode array for adjusting one of the survey or focusing currents of each electrode array in response to the distribution of potentials on the survey and focusing electrodes of each electrode array so that the focusing current will confine the survey current associated with each electrode array to desired current flow patterns; and
   (d) second means coupled to the potential reference electrode and the first means and responsive to at least one of the survey currents and to the relationship between the potential on said potential reference electrode and a reference potential supplied by said first means for providing indications of the conductivity of the surrounding earth formations.

17. In well logging apparatus for investigating earth formations surrounding a borehole, the combination comprising:
   (a) a plurality of electrodes adapted for movement through the borehole, the electrodes including:
      (1) a first electrode array, at least one electrode of which is adapted to emit current into the surrounding earth formations;
      (2) a second electrode array, at least one electrode of which is adapted to emit current into the surrounding earth formations;
      (3) a potential reference electrode located intermediate the two electrode arrays;
   (b) first means for supplying current between at least one electrode of said first and second electrode arrays, the current passing through the earth formations between the electrode arrays; and
   (c) second means coupled to the potential reference electrode and the first means for providing indications of the conductivity of the surrounding earth formations, said second means including means responsive to at least part of the emitted current for deriving first and second measurements representative the conductivity of formations proximate to said first and second electrode arrays respectively, and means responsive to the difference between the potential on said potential reference electrode and a reference potential supplied by said first means, which reference potential is between the potentials on said at least one electrode of said first and second electrode arrays, for producing an output signal representative of the relative accuracy of the first and second measurements.

18. The apparatus of claim 17 wherein said second means further includes recorder means for recording said first and second conductivity measurements and said output signal for subsequent use in determining the true formation conductivity.

19. The apparatus of claim 17 wherein said second means includes means responsive to the polarity of said output signal for selecting one of said first or second measurements for recording to thereby produce an indication of the true formation conductivity.

20. The apparatus of claim 3 wherein the second means includes means responsive to the currents emitted by said at least one electrode of the first and second electrode arrays for providing first and second output signals representative thereof, means responsive to the difference between the potential on said potential reference electrode and a reference potential supplied by said first means for producing a third output signal representative of the relative accuracy of said first and second output signals, and means for recording said first, second, and third output signals for subsequent use in determining the true formation conductivity.

21. Well logging apparatus for investigating earth formations surrounding a borehole, comprising:
   (a) a plurality of electrodes adapted for movement through the borehole, the electrodes including:
      (1) a first focused electrode array having at least one focusing electrode and one survey electrode which are adapted to emit current into the surrounding earth formations;
      (2) a second focused electrode array having at least one focusing electrode and one survey electrode which are adapted to emit current into the surrounding earth formations;
      (3) a potential reference electrode located intermediate the two electrode arrays;
   (b) means for supplying a potential to at least one electrode of each electrode array, the supplied potential for each electrode array being symmetrical relative to a reference potential;

(c) means responsive to the potential supplied to said electrode of each electrode array for maintaining the survey and focusing electrodes of each array at substantially the same potential and measuring the emitted survey current from each array to produce current measurements;

(d) means for measuring the difference between the potential of the potential reference electrode and the reference potential for providing a potential difference signal; and (e) means for combining each of the current measurements with the potential reference signal to produce measurements of the conductivity of a formation proximate to one of the first or second electrode arrays.

22. The apparatus of claim 21 wherein the combining means includes means responsive to the current measurements for each of the electrode arrays and to the potential difference signal for producing first and second conductivity measurements relating to representations of the formation conductivity proximate to the first and second electrode arrays, and means responsive to the potential difference signal for determining the relative accuracy of said first and second conductivity measurements so that a measure of the true formation conductivity can be obtained.

23. A method of investigating earth formations surrounding a borehole, comprising:

(a) moving a plurality of electrodes, including first and second electrode arrays and a potential reference electrode, through the borehole;

(b) supplying current between the electrode arrays from a current supplying means for emission into the surrounding earth formations, the current passing through the earth formations between the electrode arrays;

(c) measuring the difference between the potential of said potential reference electrode and a reference potential supplied by said current supplying means; and (d) simultaneously providing indications of the conductivity of the earth formations surrounding each of the electrode arrays in response to said measured potential difference and at least a portion of the current emitted into the earth formations surrounding each of the electrode arrays.

24. The method of claim 23 wherein reference potential supplied by the current supplying means is midway between the potentials on at least one electrode of each electrode array.

25. A method of investigating earth formations surrounding a borehole, comprising:

(a) moving first and second exploring means and a potential reference electrode located between said exploring means through a borehole, each of said exploring means comprising at least one current-emitting electrode;

(b) supplying current between said at least one electrode of each exploring means for passage through a formation and producing a reference potential which is within the range defined by the potentials on said at least one electrode of each exploring means;

(c) measuring an electrical parameter associated with said at least one electrode of each exploring means to produce first and second measurements;

(d) comparing the reference potential with the potential on said potential reference electrode to produce a third measurement representative of the condition of a formation; and (e) combining said first, second and third measurements to obtain at least one indication of formation conductivity or resistivity.

26. The method of claim 25 wherein the step of combining said measurements includes the steps of combining said first and third measurements in a given relationship to obtain a measure of the conductivity or resistivity of a formation proximate to said first exploring means, combining said second and third measurements in a given relationship to obtain a measure of the conductivity or resistivity proximate to said second exploring means, and monitoring the relative amplitude of said third measurement to determine which of the conductivity or resistivity measurements are more accurate, whereby an indication of the true formation conductivity or resistivity can be obtained.

27. The method of claim 26 wherein the step of combining said first, second and third measurements further includes the steps of monitoring the borehole depth interval over which the third measurement exceeds a given amplitude level and combining a conductivity or resistivity measurement derived from one of said first and second exploring means with said first and second measurements if said depth interval is greater than a predetermined amount to produce a computed conductivity measurement which is more accurately representative of formation conductivity or resistivity.

28. A method of investigating earth formations surrounding a borehole, comprising:

(a) moving first and second exploring means and a potential reference electrode located between said exploring means through a borehole, each of said exploring means comprising at least one current-emitting electrode;

(b) supplying current between said at least one electrode of each exploring means for passage through a formation and producing a reference potential which is within the range defined by the potentials on said at least one electrode of each exploding means; and (c) comparing the reference potential with the potential on said potential reference electrode to obtain an indication of the homogeneity of a formation proximate to said first and second exploring means.

References Cited

UNITED STATES PATENTS

| | | | |
|---|---|---|---|
| 2,712,609 | 7/1955 | Herzog et al. | |
| 2,972,101 | 2/1961 | Witte | 324—10 XR |
| 3,065,406 | 11/1962 | Mayes | 324—10 XR |
| 3,075,142 | 1/1963 | Albright et al. | 324—1 |
| 3,256,480 | 6/1966 | Runge et al. | 324—10 |
| 3,262,050 | 7/1966 | Threadgold et al. | 324—10 |
| 3,329,889 | 7/1967 | Tanguy | 324—10 XR |
| 3,365,658 | 1/1968 | Birdwell | 324—10 |
| 3,373,349 | 3/1968 | Tanguy | 324—10 |
| 3,388,324 | 6/1968 | Sloughter | 324—10 |
| 3,390,323 | 6/1968 | Kisling | 324—10 |

GERARD R. STRECKER, Primary Examiner